(12) United States Patent
Cadarette et al.

(10) Patent No.: US 10,831,613 B2
(45) Date of Patent: Nov. 10, 2020

(54) REPLICATING A SOURCE DATA SET TO A TARGET DATA STORE

(71) Applicant: International Business Machines Corporation, Armonk, NY (US)

(72) Inventors: Paul M. Cadarette, Hemet, CA (US); Robert S. Gensler, Jr., Beavercreek, OH (US); Joseph L. Kidd, Fish Creek, WI (US); Robert D. Love, Littleton, NC (US); Terri A. Menendez, Richmond, MA (US); Austin J. Willoughby, Voorheesville, NY (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 15/201,177

(22) Filed: Jul. 1, 2016

(65) Prior Publication Data

US 2017/0046232 A1 Feb. 16, 2017

Related U.S. Application Data

(63) Continuation of application No. 14/822,739, filed on Aug. 10, 2015, now Pat. No. 10,013,316.

(51) Int. Cl.
*G06F 11/14* (2006.01)
*G06F 16/22* (2019.01)
(Continued)

(52) U.S. Cl.
CPC .......... *G06F 11/1469* (2013.01); *G06F 3/061* (2013.01); *G06F 3/065* (2013.01); *G06F 3/067* (2013.01); *G06F 3/0619* (2013.01); *G06F 3/0689* (2013.01); *G06F 11/00* (2013.01); *G06F 11/14* (2013.01); *G06F 11/1451* (2013.01); *G06F 11/1474* (2013.01); *G06F 16/2228* (2019.01)

(58) Field of Classification Search
None
See application file for complete search history.

(56) References Cited

U.S. PATENT DOCUMENTS 6,289,357 B1 9/2001 Parker
6,304,882 B1 10/2001 Strellis et al.
(Continued)

OTHER PUBLICATIONS

"FCLGC—File Control Log Record Format", [online], [Retrieved on Jul. 23, 2015]. Retrieved from the Internet at <URL: http://www-01.ibm.com/support/knowledgecenter/api/content/nl/en-us/ . . . >, Total 7 pp.
(Continued)

*Primary Examiner* — Charles J Choi
(74) *Attorney, Agent, or Firm* — Konrad Raynes Davda & Victor LLP; David W. Victor (57) ABSTRACT

Provided are a computer program product, system, and method for replicating a source data set to a target data store. A point-in-time copy of the source data set is generated having a data structure identifying the data in the source data set as of a point-in-time. A restore operation is initiated to copy the source data set represented by the point-in-time copy to a restored copy of the source data set consistent with the source data set. The source data set records are transferred from the restored copy to the target data store in the target storage.

20 Claims, 6 Drawing Sheets

(51) Int. Cl.
*G06F 3/06* (2006.01)
*G06F 11/00* (2006.01)

(56) References Cited

U.S. PATENT DOCUMENTS

| | | | |
|---|---|---|---|
| 7,284,019 B2* | 10/2007 | Adkins | G06F 11/1451 |
| 7,467,268 B2 | 12/2008 | Lindemann et al. | |
| 7,509,354 B2 | 3/2009 | McGarvey | |
| 7,594,138 B2* | 9/2009 | Abdulvahid | G06F 11/1469 714/6.1 |
| 7,809,691 B1* | 10/2010 | Karmarkar | G06F 11/1469 707/674 |
| 8,478,958 B2 | 7/2013 | Kano | |
| 8,589,406 B2 | 11/2013 | Lillibridge | |
| 2005/0187990 A1* | 8/2005 | Pace | G06F 17/30067 |
| 2009/0170569 A1* | 7/2009 | Anzai | H04M 1/72527 455/573 |
| 2011/0047343 A1 | 2/2011 | Spear et al. | |
| 2011/0258391 A1* | 10/2011 | Atkisson | G06F 11/108 711/118 |
| 2012/0198191 A1 | 8/2012 | Kano | |
| 2014/0201150 A1 | 7/2014 | Kumarasamy et al. | |
| 2015/0186441 A1 | 7/2015 | Chang et al. | |
| 2015/0212893 A1 | 7/2015 | Pawar et al. | |
| 2015/0212895 A1 | 7/2015 | Pawar et al. | |
| 2015/0261618 A1 | 9/2015 | Agombar et al. | |
| 2016/0321142 A1 | 11/2016 | Fang et al. | |

OTHER PUBLICATIONS

IBM, "DFSMStvs Administration Guide", First Edition, May 2003, Copyright International Business Machines Corporation 2003, Doc. No. GC26-7483-00, Total 406 pp.

IBM, "DFSMSdss Storage Administration", Version 2 Release 1, Copyright IBM Corporation 1984, 2014, Doc. No. SC23-6868-01, Total 710 pp.

U.S. Appl. No. 14/822,739, filed Aug. 10, 2015, entitled "Replicating a Source Data Set to a Target Data Store", invented by P.M. Cadarette et al., Total 31 pp. [57.362 (Appln)].

Preliminary Amendment, dated Jul. 1, 2016, for U.S. Appl. No. 14/822,739, filed Aug. 10, 2015 by P.M. Cadarette et al., Total pp. [57.362 (PrelimAmend)].

List of IBM Patents or Patent Applications Treated as Related, dated Jul. 1, 2016, Total 2 pp.

Office Action1, dated Oct. 18, 2017, for U.S. Appl. No. 14/822,739, filed Aug. 10, 2015 by P.M. Cadarette et al., Total 16 pp. [57.362 (OA1)].

Response to Office Action 1, dated Jan. 18, 2018, for U.S. Appl. No. 14/822,739, filed Aug. 10, 2015 by P.M. Cadarette et al., Total 11 pp. [57.362 (ROA1)].

List of IBM Patents or Patent Applications Treated as Related, Jul. 26, 2018, Total 2 pp.

U.S. Appl. No. 16/045,728, filed Jul. 25, 2018, entitled "Replicating a Source Data Set to a Target Data Store", invented by P.M. Cadarette et al., Total 31 pp. [57.362C2 (Appln)].

Preliminary Amendment for U.S. Appl. No. 16/045,728, pp. 7, dated Jul. 25, 2018, (57.362C2).

Notice of Allowance for U.S. Appl. No. 14/822,739, pp. 6, dated Feb. 27, 2018, (57.362).

Notice of Allowance 2 for U.S. Appl. No. 14/822,739, pp. 11, dated May 24, 2018, (57.362).

Office Action 1 for U.S. Appl. No. 16/045,728, dated Oct. 16, 2019, 21 pp. [57.362C2 (OA1)].

Response to Office Action 1 for U.S. Appl. No. 16/045,728, dated Jan. 12, 2020, 11 pp. [57.362C2 (ROA1)].

Notice of Allowance 1 for U.S. Appl. No. 16/045,728, dated Feb. 28, 2020, 7 pp. [57.362C2 (NOA1)].

\* cited by examiner

REPLICATING A SOURCE DATA SET TO A TARGET DATA STORE

BACKGROUND OF THE INVENTION

1. Field of the Invention

The present invention relates to a computer program product, system, and method for replicating a source data set to a target data store.

2. Description of the Related Art

In replication systems, an initial full copy of the source data is copied to the target data before changes are replicated from the source to the target. The copied target data must be point-in-time consistent with the source data, such that no committed data is missed. The copied data must include every record in the source data set from the start to the end of the initial copy process. The replication process may log changes that occur during the initial copy process. If an application later rolls back a transaction made to the source data, such as deleting a record inserted by the transaction, the replication system must handle the reversal by processing a replication log.

One technique for creating the initial copy is for the replication system to obtain exclusive control of the source data set during the refresh or initial copy stage. However, this technique could adversely affect application access to the source data while the initial copy is made. The refresh operation to create the initial copy may take an extended period of time, depending on network speed and the performance of the target system. After the initial copy is made, the lock may be released and any further logged changes can be sent to the target data.

There is a need in the art for improved techniques for creating the initial copy of the source data to be replicated that has minimal impact on application access to the source data.

SUMMARY

Provided are a computer program product, system, and method for replicating a source data set to a target data store. A point-in-time copy of the source data set is generated having a data structure identifying the data in the source data set as of a point-in-time. A restore operation is initiated to copy the source data set represented by the point-in-time copy to a restored copy of the source data set consistent with the source data set. The source data set records are transferred from the restored copy to the target data store in the target storage.

DETAILED DESCRIPTION

Described embodiments provide techniques for creating an initial replication copy of a source data set, such as an indexed data set, in a manner that minimizes the impact to applications needing continual access to the data set. The initial copy operation involves generating a point-in-time copy of the source data set. The point-in-time copy includes data structures identifying the source data set to copy to the target data store. After creating the point-in-time copy, a restore operation is initiated with respect to the point-in-time copy to copy the source data set represented by the point-in-time copy to a restored copy of the source data set consistent with the source data set. The source data set records are then transferred from the restored copy to a target data store in the target storage. Because the restored copy is used to create the initial copy at the target storage, application operations with respect to the source data set may continue without being impacted while the data is transferred from the restored copy to the target data store at the target storage.

Figure 1:
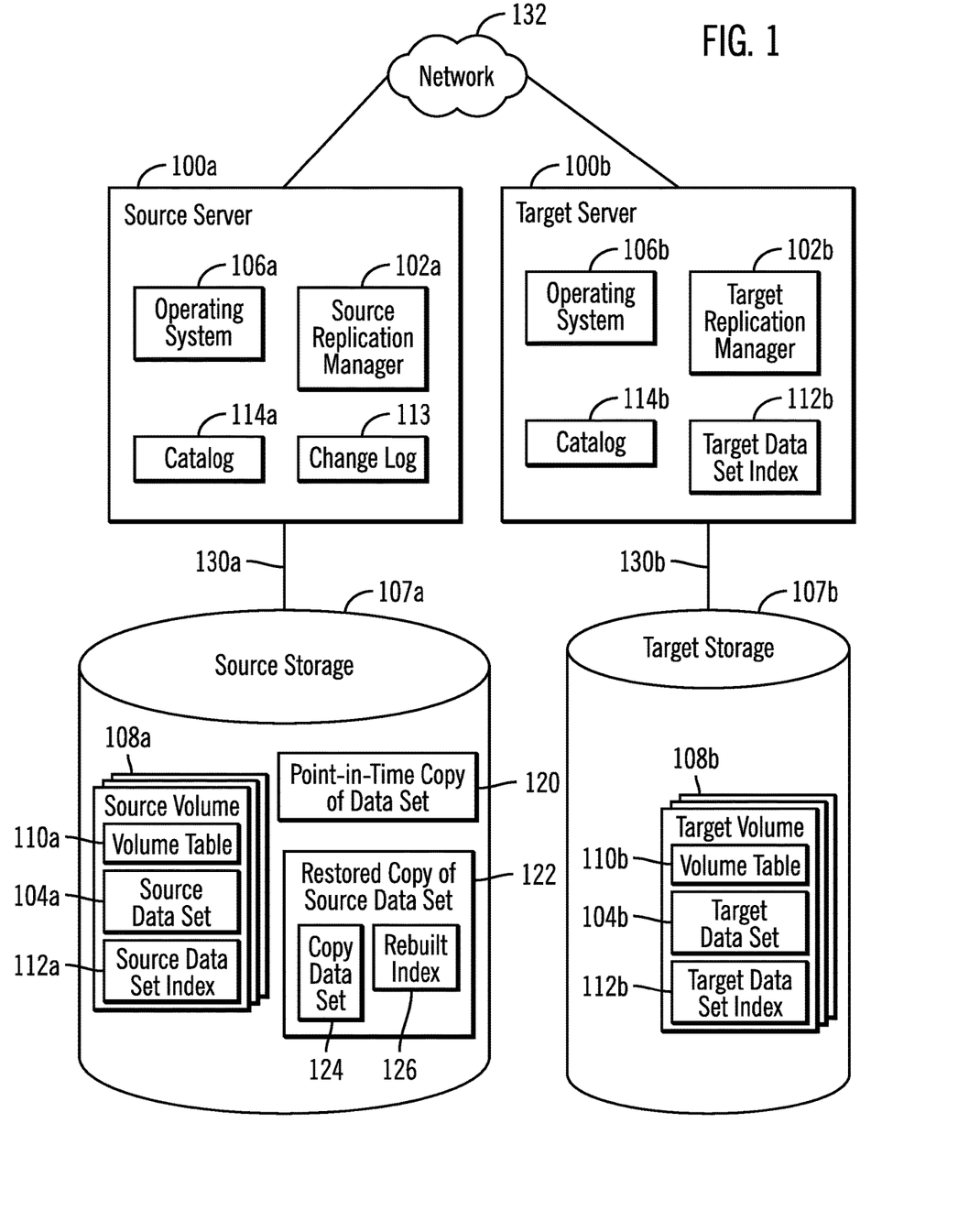
FIG. 1 illustrates an embodiment of a replication environment.

FIG. 1 illustrates an embodiment of a computing environment including a source server 100a and a target server 100b including a source replication manager 102a and target replication manager 102b, respectively, to replicate a source data set 104a in a source storage 107a to a target data set 104b in a target storage 107b. Either server 100a, 100b device may function as the source and target server of the replication operation. The source server 104a may receive updates to the records in the source data set 104a from a client (not shown).

A data set 104a, 104b comprises a collection of data intended to be stored in a same logical allocation of data, such as data from a single application, user, enterprise, etc. A data set 104a, 104b may be comprised of separate files or records, or comprise a single file or record. Each record or file in the data set 104a, 104b may be comprised of extents of data or tracks.

The servers 100a, 100b each include an operating system 106a, 106b to manage the storage of data sets 104a, 104b in volumes 108a, 108b. The operating system 106a, 106b may comprise the IBM z/OS® operating system or other operating systems for managing data sets in volumes or other logical data structures. The operating system 106a, 106b further include a particular component for managing data in the volumes 108a, 108b, such as the Data Facility Storage Management Subsystem (DFSMS) that automatically manages data from creation to expiration. (IBM, z/OS, and DFSMS are trademarks of IBM worldwide).

The operating systems 106a, 106b create a volume table 110a, 110b on the volume 108a, 108b, respectively, including a mapping of tracks and extents of tracks to one or more data sets 104a, 104b. The volume table 110a, 110b indicates one or more data set records for each data set allocated in the volume 108a, 108b. In embodiments where the operating system 106a, 106b comprises the Z/OS operating system, the data set records may comprise data set control blocks ("DSCBs"). In IBM z/OS operating system implementations, the volume table 108a, 108b may comprise a volume table of contents ("VTOC"). In alternative embodiments, the volume tables 110a, 110b may comprise a file allocation table or other types of file allocation data structures that provide a mapping of data to storage locations, either logical and/or physical storage locations. In this way, the volume tables 110a, 110b provides a mapping of tracks to data sets 104a, 104b in the volume 108a, 108b.

The data set records in the volume table 110a, 110b include a data set name and information on extents of tracks allocated to the data set. Tracks may be stored in extents, which provide a mapping or grouping of tracks in the volume 102. The extents may be defined as tracks, where tracks may be expressed as disk, cylinder, head and record location (CCHHR), or other formats. Terms such as tracks, data units, blocks, extents, etc., may be used interchangeably to refer to a unit of data managed in the volume 108a, 108b.

In certain embodiments, the data sets 104a, 104b may conform to the Virtual Storage Access Method (VSAM) used for storing and accessing data sets, introduced by International Business Machines Corp. In VSAM and other embodiments, the data sets 104a, 104b may comprise indexed data sets having records that are indexed according to a primary key that is used to locate the records in the data sets 104a, 104b. In VSAM embodiments, the data sets 104a, 104b are collections of records grouped into control intervals in a fixed area of the storage space, called control areas. Further, the VSAM records are indexed by a key and relative byte address. Data set indexes 112a, 112b provide an index to the records in an indexed data set 104a, 104b. For instance, in IBM z/OS DFSMS implementations, the data set may comprise a Key Sequenced Data Set (KSDS) used in the IBM Virtual Storage Access Method (VSAM) storage, where each record in the KSDS data set has a unique key in the indexes 112a, 112b used to locate the record in the data set 104a, 104b. The operating systems 106a, 106b may further maintain a catalog 114a, 114b that has further information on the data sets 104a, 104b configured in the volumes 108a, 108b.

Although certain embodiments and implementations of the operating system 106a, 106b, volume table 110a, 110b, and data storage technologies are described with respect to the IBM VSAM access method and Z/OS operating system, the described embodiments may apply to other operating system and storage architectures from the same or different vendors. For instance, the embodiments may apply to operating systems that use different types of allocation or volume tables than a VTOC, different types of metadata on the allocation of storage to data sets than a VVDS, and different types of storage formats, access methods and architectures than VSAM.

In the embodiment of FIG. 1, the records of the source data set 104a are shown as replicated to a target data set 104b. In the embodiment of FIG. 1, the source 104a and target 104b data sets may have the same format, such as both be VSAM data sets. In alternative embodiments, the records of the source data set 104a may be replicated to target data store types other than a target data set 104b. For instance, in addition to being a target data set, the target data store may alternatively comprise a database or other data structure into which the records from the source data set 104a are inserted. In this way, the target data store may be in an entirely different format than the source data set 104a. For instance, in one embodiment, the source data set 104a may comprise an indexed data set, such as a VSAM data set, and the target data store may comprise a relational database or other data structure having an entirely different format and data structure than the source data set 104a.

To replicate a source data set 104a to a target data store, e.g., target data set 104b, the source replication manager 102a performs an initial refresh or copy of the source data set 104a by first generating a point-in-time copy 120 of the source data set 104a and then restoring a restored copy of the source data set 122 from the point-in-time copy 120. The restored copy 122 includes a copy of the data set 124, the data component, as well as a rebuilt index 126, rebuilt from the point-in-time copy 120. The source replication manager 102a transfers records and the index from the restored copy 122 to the target replication manager 102b to store in the target data store in the target storage 107b.

The point-in-time copy 120 may be completed upon generating the data structures representing the source data set 104a consistent as of a point-in-time, such as a bitmap representing tracks in the source data set 104a to copy. In certain embodiments, the point-in-time copy is completed almost instantaneously after generating the data structures representing the point-in-time copy before the source data set 104a records identified by the point-in-time copy are physically copied to the target data store.

The source replication manager 102a accesses a change log 113 having changes to the records in the source data set 104a received after the point-in-time copy 120 is created. The change log 113 buffers changed records for transmission to the target data store 104a being replicated to copy over any changes that occur during and after the initial copy creation of the target data set 104b. The records in the change log 113 include the index key as well as the data for the record, such as the entire image.

Figure 2:
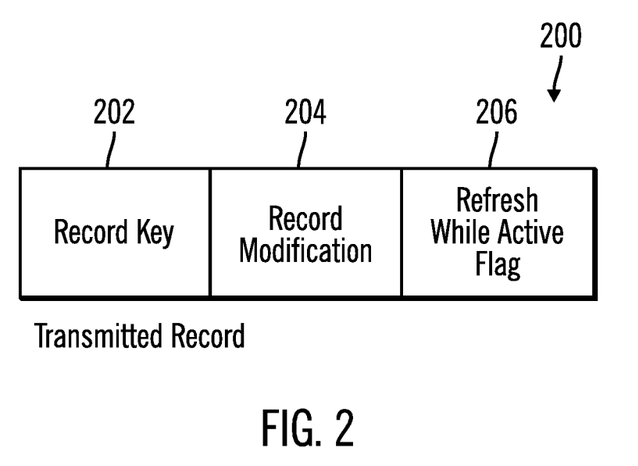
FIG. 2 illustrates an embodiment of a changed record transferred to the target data store.

FIG. 2 illustrates an embodiment of a transmitted record 200 that the source replication manager 102a sends from the restored copy 122 to include in the target data store, such as the target data set 104b. The transmitted record 200 includes a record key 202 uniquely identifying the record; a record modification 204, such as the change to the data or full copy of data; and a refresh while active (RWA) flag 206 indicating whether the source data set 104a was open to a transaction or application when the point-in-time copy 120 was created. RWA flag 206 is added based on when the original change occurred and when the refresh or point-in-time copy occurred.

The RWA flag 206 is used to reflect that the change indicated by the transferred record 200 from the log 113 may already be reflected in the point-in-time copy 120 and in the final target data set 104b and does not need to be reapplied to the target data store if already reflected. The RWA flag 206 addresses the situation where refresh processing (i.e., the initial copy creation) begins slightly before the point-in-time copy 120 is made and replication may process log records that occurred prior to the point-in-time copy. For example, the user starts refresh (refresh begins) then an application deletes a record, and then the point-in-time copy 120 is made. The record will not be sent to the target data store during refresh, but the delete is still processed when replication starts. The target replication manager 102b will attempt to delete the record, but by processing the RWA flag 206, will ignore errors indicating the key was not found. This RWA processing only occurs from the start of refresh processing to the end of refresh processing. At that point, there are no further transactions that were in-flight when the refresh occurred. In certain embodiments, the times and flags are stored in metadata maintained by the source replication manager 102a, so that this processing is active even if the replication system is restarted.

With the described embodiments, the initial copy or refresh does not interfere with application access to the source data set 104a because the initial copy is made from a restored copy 122 of the source data set, not the actual production source data set 104a being used.

The source 107a and target 107b storages may each be implemented in one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Although a certain number of instances of elements, such as servers, storages, active and inactive copy relationships, etc., are shown, there may be any number of these components.

The source replication manager 102a and target replication manager 102b may comprise software programs in a memory executed by a processor. In an alternative embodiment, some portion or all of the programs 102a, 102b, 106a, 106b may be implemented in a hardware component, such as a dedicated integrated circuit, e.g., Application Specific Integrated Circuit (ASIC), expansion card, etc.

Although the source replication manager 102a and target replication manager 102b are shown as separate components, in alternative implementations the functions performed by these components 102a, 102b may be implemented in a single program component in a single computer system or in more than two program components in more than two computer devices.

The source 102a and target 102b replication managers may be used by client nodes to recover objects as part of a restore operation.

The servers 100a, 100b communicate with their respective the storage 107a, 107b via connection 130a, 130b. The connections 130a, 130b may comprise one or more networks, such as a Local Area Network (LAN), Storage Area Network (SAN), Wide Area Network (WAN), peer-to-peer network, wireless network, etc. Alternatively, the connection 116 may comprise bus interfaces, such as a Peripheral Component Interconnect (PCI) bus or serial interface.

The source server 100a and target server 100b may be implemented in separate computer devices that communicate over a network 132, such as a local area network (LAN), storage area network (SAN), wide area network (WAN), etc., which may be connected or separate from the networks 130a, 130b. In further embodiments, the source server 100a and target server 100b may be implemented on one or two computer systems. If the source server 100a and target server 100b are in the same system, then they may communicate over a bus or via memory.

Figure 3:
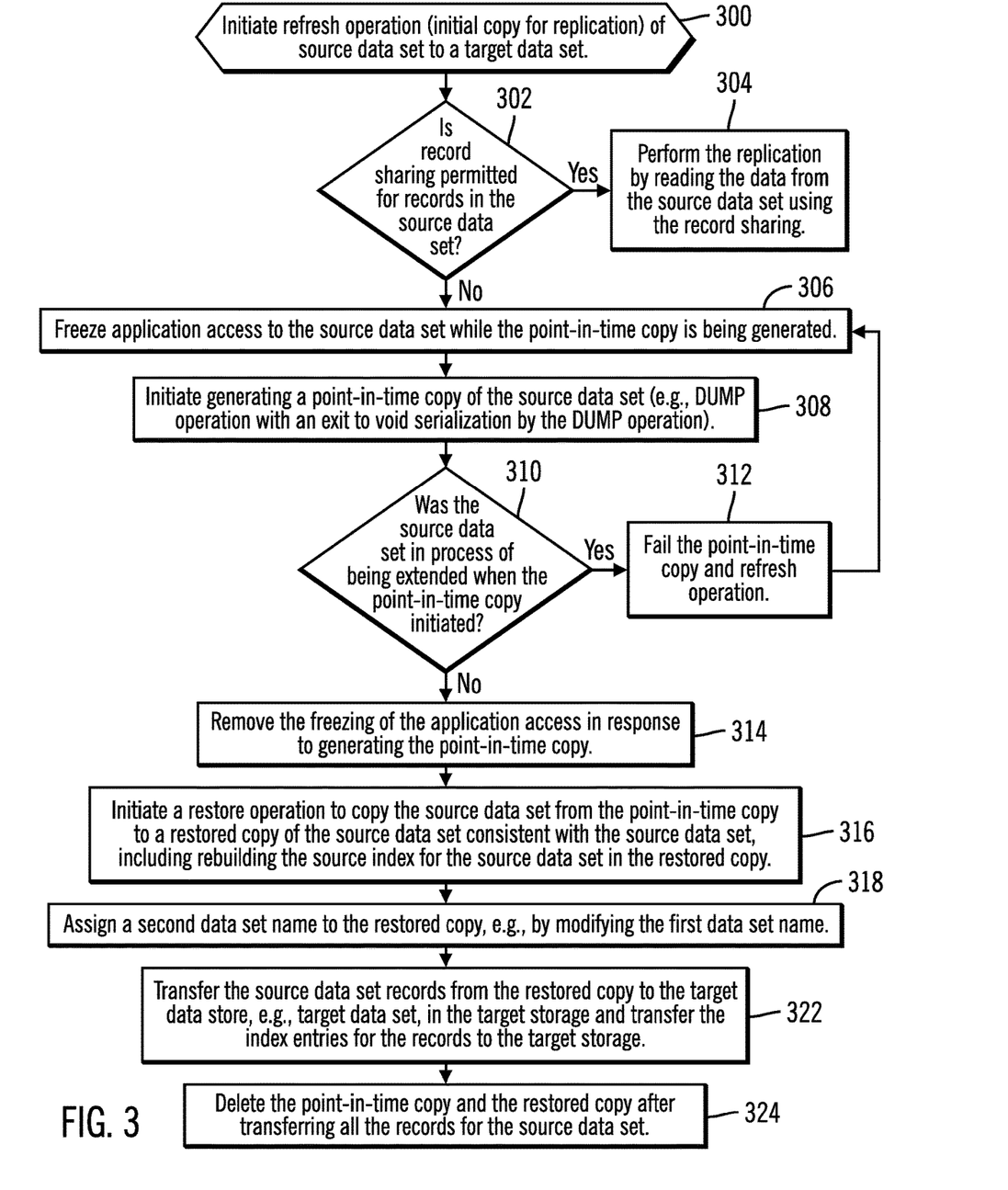
FIG. 3 illustrates an embodiment of operations to create an initial copy of a source data set at a target data store.

FIG. 3 illustrates an embodiment of operations performed by the source replication manager 102a to refresh the source data set 104a to provide an initial full copy of the source data set 104a at the target data store, e.g., target data set 104b, so that data can be continually replicated after the initial copy. The operations of FIG. 3 may be invoked by a user through a user interface or program or automatically by the source replication manager 102a. Upon initiating the initial copy operation (at block 300), the source replication manager 102a determines (at block 302) whether record sharing is permitted for records in the source data set 104a. If so (at block 302), then the refresh (initial copy) operation is performed by performing an alternative replication operation, such as by reading (at block 304) the data from the source data set 106, using the record sharing technique implemented for the source data set 106a, and then copying the read data to the target data store. For instance, if the source data set 104a is part of a VSAM cluster that may be accessed in Record Level Sharing (RLS) mode, where different applications can have exclusive access to different records, then the replication may be performed by accessing the data in the RLS mode to create the initial copy. Other techniques may be used to replicate the data if other types of record sharing technologies are used at the source data set 104a.

If the source data set 104a is not being accessed in a manner that should preclude the operations of FIG. 3, e.g., record level sharing, then control proceeds to block 306 to proceed with the replication by freezing (at block 306) access to the source data set 104a while the point-in-time copy 120 is being created. A point-in-time copy is created almost instantaneously by creating the data structures used to manage the point-in-time copy, including a bitmap indicating each track that needs to be copied and other information on the copy. The point-in-time copy 120 may complete after creating these supporting data structures and bitmap, before the actual data is copied to the target storage 107b. The replication manager 102a initiates (at block 308) generating the point-in-time copy 120 of the source data set 104a with a point-in-time copy command that is invoked with an exit to avoid serialization of access to the records in the source data set 104a while creating the point-in-time copy 120. In one embodiment, the point-in-time copy 120 is generated using a DUMP operation with the exit to avoid serialization by the DUMP operation. In one embodiment, the DUMP operation may comprise the DFSMSdss DUMP operation to create a logical data set dump. Further, the serialization by the DUMP is bypassed by using an exit, such as a User Interaction Module (UIM) exit, to avoid having to obtain exclusive control of the source data set 104a to perform the DUMP and create the logical point-in-time copy 120. Avoiding serialization during the DUMP operation avoids any adverse impact to applications accessing the source data set 104a that would otherwise result if exclusive access was required.

If (at block 310) the source data set 104a was in the process of being extended when the point-in-time copy was initiated, then the replication is failed (at block 312) and control returns to block 306 to retry the initial copy stage of the replication operation. If (at block 310) the source data set was not being extended, then the point-in-time copy 120 completes, and the freeze of the application access is removed (at block 314). A data set is extended when additional space is allocated to the data set to allow the data set to extend to the same or another (new) volume or storage.

The source replication manager 102a may then initiate (at block 316) a restore operation of the point-in-time copy 120 to restore the source data set 104a from the point-in-time copy 120, e.g., the DUMP, to a restored copy 122 including the copy data set 124 consistent with the source data set 104a as of the point-in-time of the point-in-time copy 120. As part of the restore operation, the source replication manager 102a rebuilds the source index 112a for the source data set 104 as the rebuilt index 126 in the restored copy 122. The index may be rebuilt by processing the records in the copy data set 124. For instance, in VSAM embodiments, the index information is also included in metadata for the data records and in other metadata, such as the catalog 114a. The restored copy 122 may be maintained in the source storage 104a. Thus, the refresh initial copy operation generates two additional copies of the source data set 104a on the source storage 107a, including the point-in-time copy 120 and the restored copy 122.

A data set name is assigned (at block 318) to the copy data set 124. In certain embodiments, the data set name for the copy data set 124 may be derived from the source data set 104a name, such as by modifying the source data set 104a name or by adding a string to the source data set name 104a. The source replication manager 102 may then transfer (at block 322) source data set records 200 from the restored copy 120 to the target data store, e.g., the target data set 104b, a database, etc., in the target storage 107b, and transfer the index entries of the rebuilt index 126 to store in the target data store of the target storage 107b. After transferring the data set records 200 in the copy data set 124 and rebuilt index 126 entries to the target data store, e.g., target data set 104b, the point-in-time copy 120 and the restored copy 122 may be deleted (at block 324) from the source storage 107a.

The operations of FIG. 3 are described with respect to replicating one source data set 104a. In further embodiments, the replication operations may be performed with respect to multiple source data sets in the source volume 108a.

With the described embodiments, by performing a DUMP/RESTORE pair of operations to create a consistent copy of the source data set 104 in the restored copy 122, the source replication manager 102a may then copy the initial copy from the restored copy 122 in a manner that does not interfere with application access to the source data set 104a. Further, by failing the point-in-time copy 120 if the source data set 104a is extended and rebuilding the index as part of the restore operation, the restored copy 122 is consistent, because the potential for inconsistencies from extending the data set and from changes from transactions open when the point-in-time copy 120 was created are eliminated.

Figure 4:
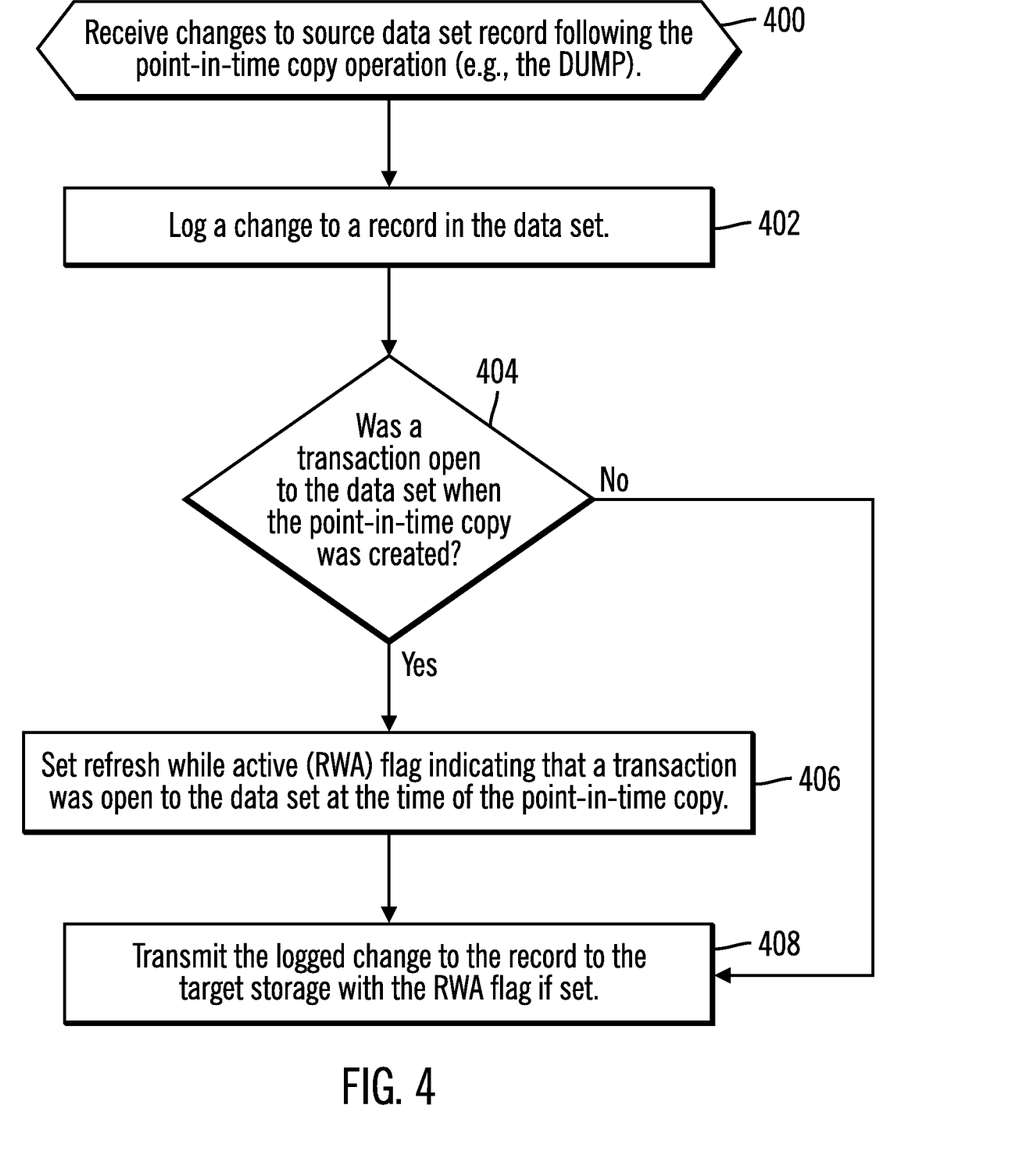
FIG. 4 illustrates an embodiment of operations to replicate changes to records in the source data set after the initial copy of the source data set is created.

After the initial copy is created as a result of the operations of FIG. 3, the source replication manager 102a may copy changed transmitted records 200 formed from records logged in the change log 113 after the point-in-time copy 120 is created to the target storage 107a as part of the continuous replication service. FIG. 4 illustrates an embodiment of operations performed by the source replication manager 102a to replicate changes after the initial copy is created at the target data set 104b. Upon receiving (at block 400) a change to a record in the source data set 104a following the creation of the point-in-time copy 120, before and after the initial copy of the target data set 104b is created, the source replication manager 102a logs (at block 402) in the change log 113 a change to the record in the source data set 104a identifying the key of the changed record and indicating the change. If (at block 404) an application or transaction had the source data set 104a open at the time the point-in-time copy 120 was created, then the RWA flag 206 is set to indicate that the source data set 104a was open at the time the point-in-time copy 120, e.g., the DUMP operation. From the no branch of block 404 or from block 406, the logged change is transferred as a transmitted record 200 (at block 408) to the target storage 107a for application to the target data store, e.g., target data set 104b. If the RWA flag 206 was set, then the change is sent with the RWA flag 206, if the flag is not set, then the RWA flag 206 is not included in the transmitted record 200.

Figure 5:
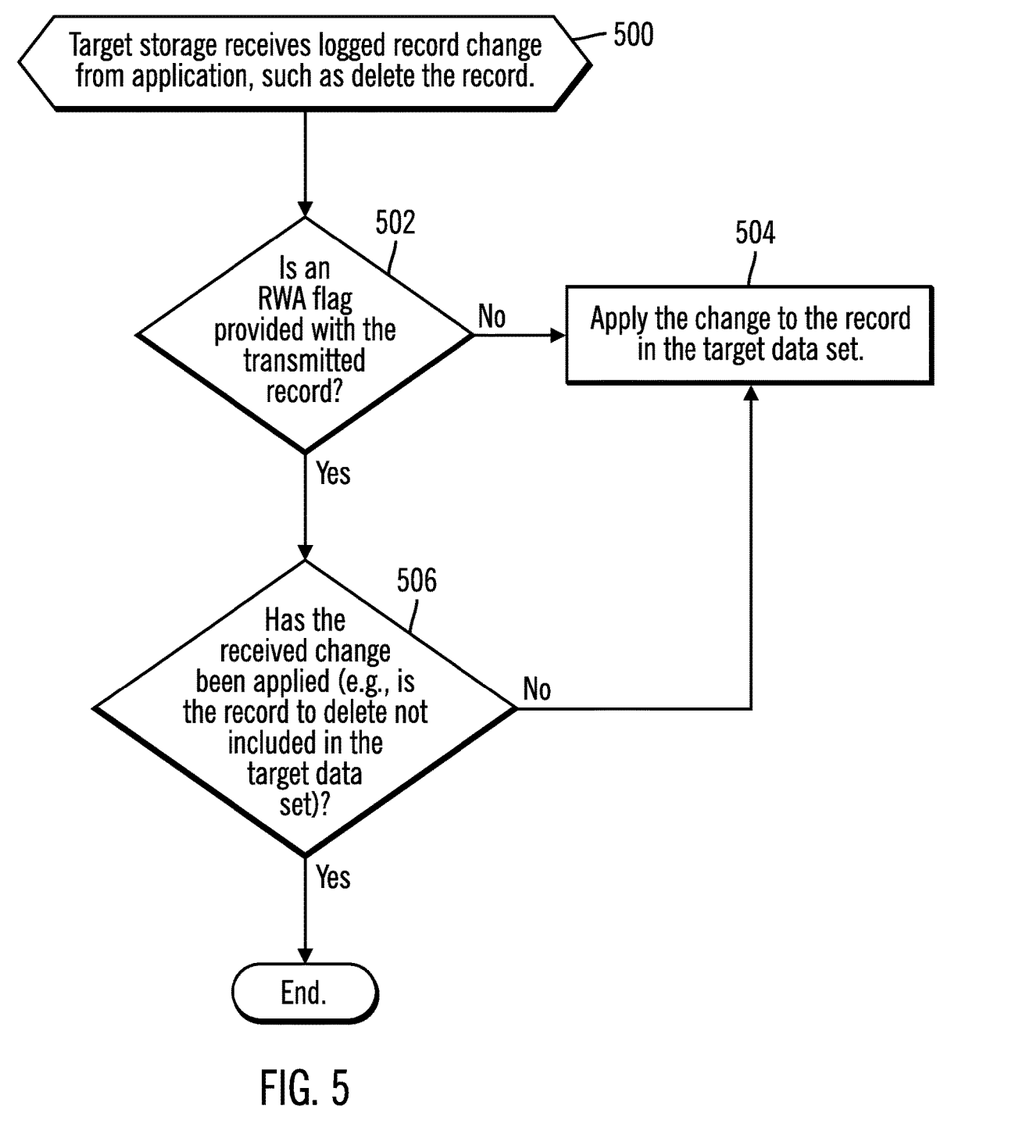
FIG. 5 illustrates an embodiment of operations to process a change to a record at the target data store.

FIG. 5 illustrates an embodiment of operations performed by the target replication manager 102b to process received changes to the record from the change log 113. Upon receiving (at block 500) a transmitted record 200 for the target data store, the target replication manager 102b determines (at block 502) whether the RWA flag 206 was included with the transmitted record 200. If not, then the change is applied to the record (at block 504). If (at block 502) the RWA flag 206 is provided indicating the source data set 104a was open to transactions when the point-in-time copy 120 was created, then the target replication manager 102b determines (at block 506) whether the received change to the record has been applied. If so, then control ends without applying the change because change has not been applied, then the change, such as deleting the record, is applied to the target data set 104b.

The described embodiments of FIG. 5 address the situation where a change was written to the source data set 104a, but reversed while the source data set 104a was open. In this way, if a record was physically in the source data set 104a at the time of the point-in-time copy 120 creation, e.g., DUMP operation, but later reversed by a transaction manager, this change is indicated to allow the target replication manager 102b to handle. The RWA flag 206 is sent with the record modification 204 in the transmitted record 200 to the target replication manager 102a to apply if the records are found and ignored if not there, indicating the change went through.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
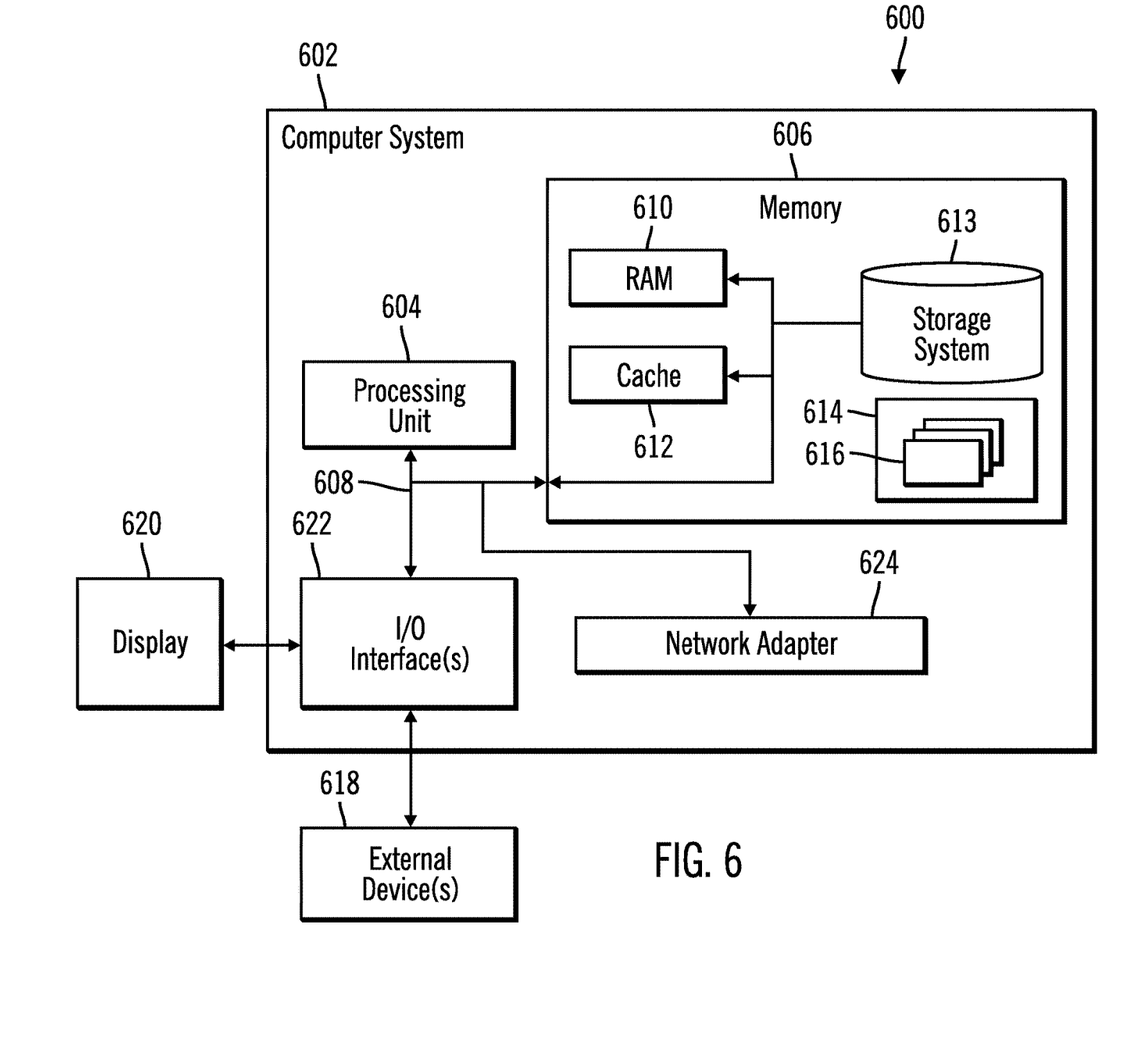
FIG. 6 illustrates a computing environment in which the components of FIG. 1 may be implemented.

The computational components of FIG. 1, including the servers 100*a* and 100*b*, may be implemented in one or more computer systems, such as the computer system 902 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for replicating a source data set in a source storage to a target data store in a target storage, comprising:
    generating a point-in-time copy of the source data set in the source storage having a data structure identifying data in the source data set as of a point-in-time;
    restoring the source data set from the point-in-time copy to a restored copy of the source data set in the source storage consistent with the source data set as of the point-in-time, wherein the source data set is separate from the restored copy of the source data set; and
    transferring source data set records from the restored copy to the target data store in the target storage to replicate the source data set in the restored copy to a target data set in the target data store as of the point-in-time, wherein the source storage and the target storage comprise different storages.

2. The method of claim 1, wherein the source data set includes a source index to records in the source data set, further comprising:
    rebuilding the source index as a rebuilt index from the point-in-time copy of the source data set to capture any changes to the source index resulting from changes to the source data set captured in the point-in-time copy, wherein the rebuilt index is consistent with the source index for the restored copy of the source data.

3. The method of claim 2, wherein the source data set and the restored copy comprise Virtual Storage Access Method (VSAM) data sets indexed by keys, wherein the rebuilding the source index accesses keys for the source index from metadata for the records in the point-in-time copy of the source data set.

4. The method of claim 1, wherein the point-in-time copy is performed by a DUMP operation invoked with an exit to avoid serialization such that the DUMP operation does not have exclusive access to the source data set.

5. The method of claim 1, further comprising:
    determining whether record sharing is permitted of records in the source data set to allow multiple users to obtain a lock for different records in the data set, wherein the generating the point-in-time copy, restoring the source data set, and transferring the data set from the restored copy are performed in response to determining that the record sharing is not permitted and wherein the generating the point-in-time copy, the restoring the source data set, and the transferring the data set from the restored copy are not performed in response to determining that the record sharing is permitted.

6. The method of claim 1, further comprising:
logging changes to the source data set that occur after the point-in-time copy is created to replicate to the target data store;
setting a flag for an one of the logged changes for a transaction that was open when the point-in-time copy was created; and
transmitting the flag with the logged change that was open when the point-in-time copy was created to the target data store, wherein the logged change is not applied to the target data store when sent with the flag if the logged change is already included in the target data store and wherein the logged change is applied to the target data store when sent with the flag if the logged change is not included in the target data store.

7. The method of claim 1, further comprising:
freezing application access to the source data set while the point-in-time copy is being generated; and
removing the freezing of the application access in response to generating the point-in-time copy, wherein access is returned after the point-in-time copy is generated.

8. The method of claim 1, further comprising:
determining that the source data set was in a process of being extended when the point-in-time copy was initiated; and
failing the point-in-time copy in response to determining that the data set was being extended when the point-in-time copy was initiated.

9. The method of claim 1, wherein the source data set is in a source cluster assigned a first data set name, and wherein the restored copy of the source data set is located in the source cluster, wherein the operations further comprise:
assigning a second data set name to the restored copy comprising a modification of the first data set name.

10. A computer program product for replicating a source data set in a source storage to a target data store in a target storage, wherein the computer program product comprises a computer readable storage medium having program instructions embodied therewith, the program instructions executable by a processor to cause operations, the operations comprising:
generating a point-in-time copy of the source data set in the source storage having a data structure identifying data in the source data set as of a point-in-time;
restoring the source data set from the point-in-time copy to a restored copy of the source data set in the source storage consistent with the source data set as of the point-in-time, wherein the source data set is separate from the restored copy of the source data set; and
transferring source data set records from the restored copy to the target data store in the target storage to replicate the source data set in the restored copy to a target data set in the target data store as of the point-in-time, wherein the source storage and the target storage comprise different storages.

11. The computer program product of claim 10, wherein the source data set includes a source index to records in the source data set, wherein the operations further comprise:
rebuilding the source index as a rebuilt index from the point-in-time copy of the source data set to capture any changes to the source index resulting from changes to the source data set captured in the point-in-time copy, wherein the rebuilt index is consistent with the source index for the restored copy of the source data.

12. The computer program product of claim 10, wherein the point-in-time copy is performed by a DUMP operation invoked with an exit to avoid serialization such that the DUMP operation does not have exclusive access to the source data set.

13. The computer program product of claim 10, wherein the operations further comprise:
determining whether record sharing is permitted of records in the source data set to allow multiple users to obtain a lock for different records in the data set, wherein the generating the point-in-time copy, restoring the source data set, and transferring the data set from the restored copy are performed in response to determining that the record sharing is not permitted and wherein the generating the point-in-time copy, the restoring the source data set, and the transferring the data set from the restored copy are not performed in response to determining that the record sharing is permitted.

14. The computer program product of claim 10, wherein the operations further comprise:
logging changes to the source data set that occur after the point-in-time copy is created to replicate to the target data store;
setting a flag for an one of the logged changes for a transaction that was open when the point-in-time copy was created; and
transmitting the flag with the logged change that was open when the point-in-time copy was created to the target data store, wherein the logged change is not applied to the target data store when sent with the flag if the logged change is already included in the target data store and wherein the logged change is applied to the target data store when sent with the flag if the logged change is not included in the target data store.

15. The computer program product of claim 10, wherein the source data set is in a source cluster assigned a first data set name, and wherein the restored copy of the source data set is located in the source cluster, wherein the operations further comprise:
assigning a second data set name to the restored copy comprising a modification of the first data set name.

16. A system for replicating a source data set in a source storage to a target data store in a target storage, comprising:
a processor; and
a computer readable storage medium having program instructions embodied therewith that when executed by the processor perform operations, the operations comprising:
generating a point-in-time copy of the source data set in the source storage having a data structure identifying data in the source data set as of a point-in-time;
restoring the source data set from the point-in-time copy to a restored copy of the source data set in the source storage consistent with the source data set as of the point-in-time, wherein the source data set is separate from the restored copy of the source data set; and
transferring source data set records from the restored copy to the target data store in the target storage to replicate the source data set in the restored copy to a target data set in the target data store as of the point-in-time, wherein the source storage and the target storage comprise different storages.

17. The system of claim 16, wherein the source data set includes a source index to records in the source data set, wherein the operations further comprise:
  rebuilding the source index as a rebuilt index from the point-in-time copy of the source data set to capture any changes to the source index resulting from changes to the source data set captured in the point-in-time copy, wherein the rebuilt index is consistent with the source index for the restored copy of the source data.

18. The system of claim 16, wherein the point-in-time copy is performed by a DUMP operation invoked with an exit to avoid serialization such that the DUMP operation does not have exclusive access to the source data set.

19. The system of claim 16, wherein the operations further comprise:
  determining whether record sharing is permitted of records in the source data set to allow multiple users to obtain a lock for different records in the data set, wherein the generating the point-in-time copy, restoring the source data set, and transferring the data set from the restored copy are performed in response to determining that the record sharing is not permitted and wherein the generating the point-in-time copy, the restoring the source data set, and the transferring the data set from the restored copy are not performed in response to determining that the record sharing is permitted.

20. The system of claim 16, wherein the operations further comprise:
  logging changes to the source data set that occur after the point-in-time copy is created to replicate to the target data store;
  setting a flag for an one of the logged changes for a transaction that was open when the point-in-time copy was created; and
  transmitting the flag with the logged change that was open when the point-in-time copy was created to the target data store, wherein the logged change is not applied to the target data store when sent with the flag if the logged change is already included in the target data store and wherein the logged change is applied to the target data store when sent with the flag if the logged change is not included in the target data store.

* * * * *